(No Model.) 2 Sheets—Sheet 1.
P. MURPHY.
SPOKE THROATING MACHINE.
No. 284,972. Patented Sept. 11, 1883.
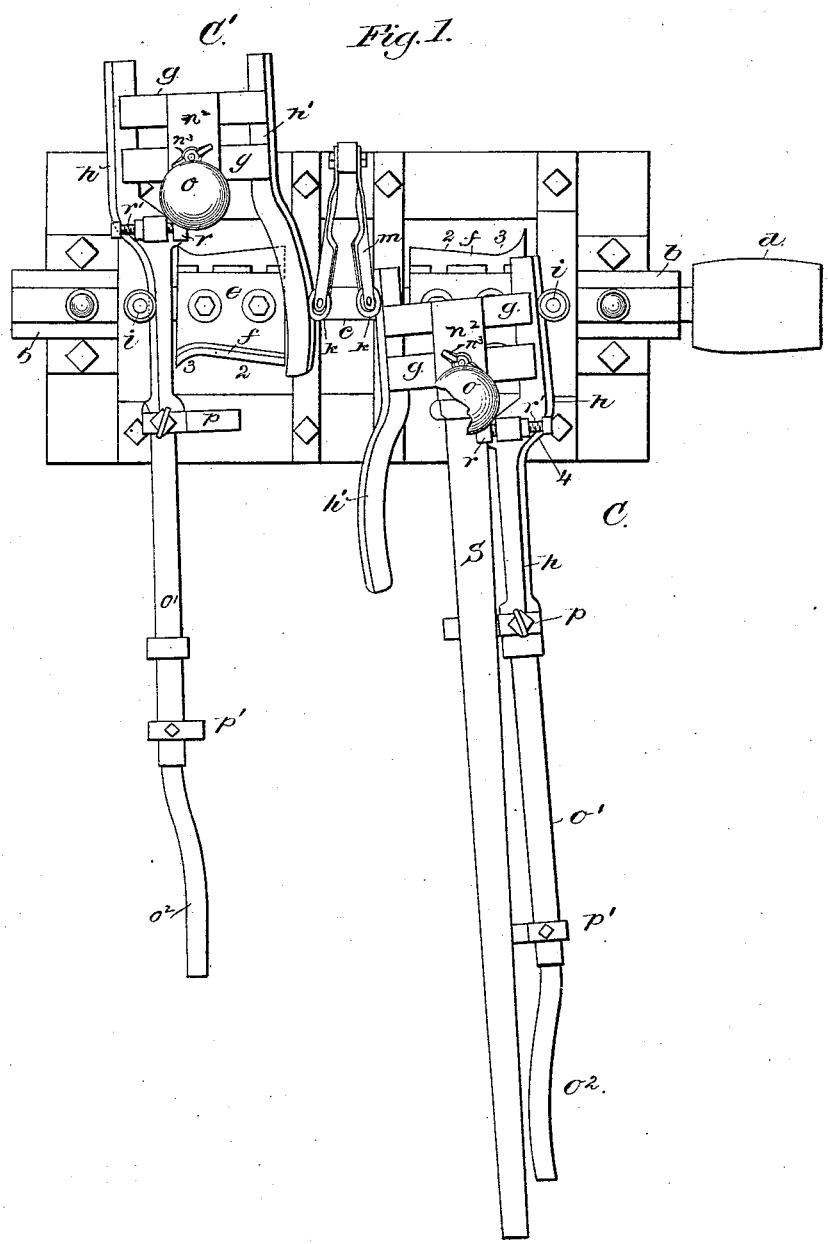
Witnesses.
John F. C. Preinkert,
George Stoeckel.
Inventor:
Patrick Murphy
By Crosby & Gregory
Attys.

(No Model.) 2 Sheets—Sheet 2.
P. MURPHY.
SPOKE THROATING MACHINE.
No. 284,972. Patented Sept. 11, 1883.
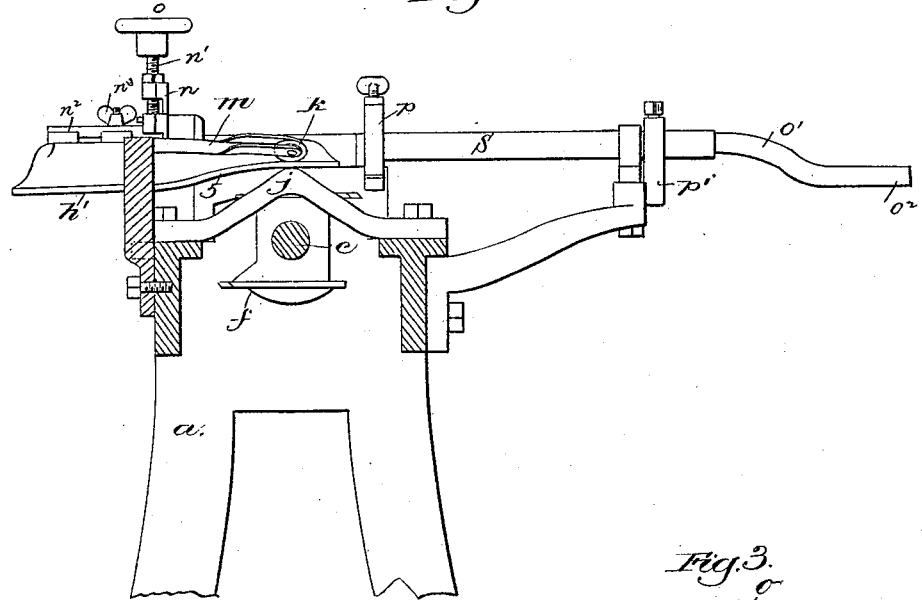
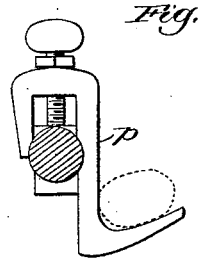
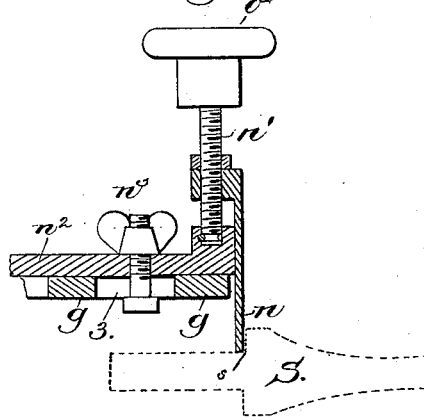
Witnesses.
John F. C. Prenkert
George Stoeckel
Inventor:
Patrick Murphy.
By Crosby & Gregory
attys.

United States Patent Office.

PATRICK MURPHY, OF MERRIMAC, MASSACHUSETTS, ASSIGNOR TO JOHN S. FOSTER, OF SAME PLACE.

SPOKE-THROATING MACHINE.

SPECIFICATION forming part of Letters Patent No. 284,972, dated September 11, 1883.

Application filed October 19, 1882. (No model.)

*To all whom it may concern:*

Be it known that I, PATRICK MURPHY, of Merrimac, county of Essex, State of Massachusetts, have invented an Improvement in Spoke-Throating Machines, of which the following description, in connection with the accompanying drawings, is a specification, like letters on the drawings representing like parts.

My invention relates to a machine for dressing spokes near the end having the tenon which is to be inserted into the hub. Previous to my invention this portion of the spoke has been dressed by machines the cutters of which are usually arranged to act transversely to the spoke, as in the process of turning, and when the cutters become somewhat dull they are apt to break off the square corners of the spoke near the tenon.

My invention has for its object to provide a machine by which the spokes are properly presented to cutters acting in a longitudinal direction; and it consists, mainly, in the combination, with a cutter having a portion of its edge straight and the adjacent portion curved, of a carriage for the spoke, and guides by which it receives a lateral and rocking movement in the course of its longitudinal movement, so that the spoke is first presented to the straight portion of the cutter to dress the square portion at its end, and when afterward moved longitudinally to present the portion more remote from the end to the cutter the spoke is also moved laterally into the range of the curved portion of the cutter, and thus properly rounded off at its edges for the desired distance from the hub. The spoke-carriage contains a tenon-holder for receiving the tenon at the end of the spoke and a support for the intermediate portion of the spoke, which extends along a bar or continuation of the carriage, forming a handle, by means of which the spoke and carriage may be grasped by one hand and held firmly together in the movement by which the spoke is presented to the cutter. The said tenon and spoke holding devices are adjustable on the carriage to enable the different spokes to be presented in different relation to the cutters to produce different sizes and shapes, as may be desired. A gage is provided for the side of the spoke near the tenon end, the said gage thus governing the effect of the cutter on the spoke in the lateral movement of the latter.

Figure 1 is a plan view of a spoke-dressing machine embodying this invention; Fig. 2, a longitudinal section thereof, and Figs. 3 and 4 details of the tenon and spoke holding devices adjustably connected with the spoke-carriage.

The frame-work or stand $a$ of the machine, of suitable form to sustain the working parts, is provided with bearings $b$ for the cutter-shaft $c$, actuated by the pulley $d$, and provided with cutter-heads $e$ for the rotating cutters $f$, which are shaped as shown, having a portion of their edge straight, as at 2, and the said straight portion at one end adjoining a portion, 3, having concave curvature. There are two cutter-heads and two carriages, C C′, having a right and left hand arrangement relative to one another and operating one to dress each side of the spoke.

The spoke-carriages each consist of a frame-work having at one side a guiding surface or cam, $h$, co-operating with a stud or roller, $i$, mounted upon the frame-work, and at its other side another cam, $h'$, having its lower surface curved, as shown in Fig. 2, to control, in connection with an abutment or support, $j$, on the frame-work, the upward and downward movement of the said side $h'$ of the carriage.

Rolls $k$, mounted on springs $m$, engage the said sides $h'$ of the carriages C C′, pressing the controlling-surfaces $h$ of the said carriages against the studs $i$, and also pressing the surfaces $h'$ against the abutments $j$. The said guiding portions $h$ $h'$ are connected by cross-bars $g$, which carry the spoke-tenon-holding device $n$, vertically adjustable by means of the adjusting-screw $n'$ in a slide, $n^2$, longitudinally adjustable upon the cross-bars $g$ of the carriage, it being held in adjusted position by the thumb-nut $n^3$, which passes through a slot, 3, in the spoke-carriage, as shown in Fig. 3. The said holding device thus also serves as a gage governing the action of the cutters on the spoke, and a gage $r$, adjustable by means of the screw $r'$, governs the position of the spoke laterally. The handle $o$ of the adjusting-screw $n'$ also serves as one of the handles for moving the carriage longitudinally between the rollers $i$ $k$ in presenting the spoke to the cutters, and the side $h$ of the said carriage is provided with a long bar, $o'$, terminating in a handle, $o^2$, and also with a spoke-holding device, $p$, (see Fig. 4,) having a hook-like form, for engaging the middle portion of the spoke S when its tenon is inserted beneath the tenon-holding device $n$, with the shoulder of the spoke resting against the end of the said device $n$, as shown at $s$, and its side resting against the gage $r$. The end of the spoke extends out by the said handle $o^2$, as shown in Fig. 1, and may be grasped by the same hand as the said handle $o^2$, a support, $p'$, being provided for the side of the said spoke, near the said handle $o^2$.

In operation the carriage is drawn forward, as shown at the right hand of Fig. 1, and the spoke applied thereto, the tenon being placed beneath the tenon-holding device $n$, as shown in Fig. 3, and the body of the spoke pressed by the hand grasping the handle $o^2$ against the supports $p$ $p'$. The carriage is then held by the stud $i$, co-operating with the guide $h$, in such position that the spoke near its tenon is presented to the straight portion 2 of the cutter, thus dressing the end of the spoke off squarely. As the carriage is moved forward to present the portions of the spoke more remote from the tenon to the cutter the receding portion 4 of the guide $h$ arrives at the roller $i$, thus permitting a lateral movement of the carriage and spoke by which the body of the spoke is presented to the curved portion 3 of the cutter and its edge rounded. At the proper time, in the said forward and lateral movement of the carriage, the rising portion 5 of the guide $h'$ permits that side of the carriage to drop, thus rocking the spoke, the various movements of the spoke in its carriage causing different portions of the cutter to enter different amounts into the body of the spoke.

The combination of the different movements derived from the guiding portions $h$ $h'$, in co-operation with the cutter shaped as described, gives the exact form desired for the spoke near the hub.

I claim—

1. In a spoke-throating machine, the combination of the rotary cutter $f$, having the straight edge 2 and curved edge 3, with the longitudinally-movable spoke-carriage having the guides $h$ $h'$, curved, as shown, and the rollers $i$ $k$, and abutment $j$, co-operating with the guides of the carriage to impart to the said carriage a lateral and vertical movement with respect of the cutters to shape the spoke as it is drawn by the carriage longitudinally over the cutter, substantially as described.

2. The longitudinally-movable spoke-carriage having the side guide, $h$, provided with the receding portion 4, and the opposite side guide, $h'$, provided with the rising portion 5, and devices to hold the spoke upon the carriage, combined with the fixed rollers $i$ and $k$, arranged to engage the said guides to move the carriage laterally, and the abutment $j$, engaging the rise 5 in guide $h'$ to elevate that side of the carriage, substantially as and for the purpose set forth.

3. The rotating cutter, and the spoke-carriage longitudinally movable over said cutter to bring the spoke in proper relation to the cutter, combined with device $n$ to engage the tenon of the spoke to properly adjust it longitudinally on the carriage, a screw, $o$, for adjusting said device $n$, and serving additionally for moving the carriage, and the slide $n^2$, longitudinally adjustable upon the cross-bars $g$ of the carriage, and held in such adjusted position by the thumb-nut $n^3$ in slot 3 of the spoke-carriage, substantially as described.

4. The spoke-carriage provided with the tenon-holding device $n$ for receiving the tenon of the spoke, gage $r$, for securing the lateral adjustment of the spoke, handle $o'$, provided with the supports $p$ $p'$ for the spoke, and the handle $o^2$, with which the spoke is grasped in moving the carriage, substantially as described.

In testimony whereof I have signed my name to this specification in the presence of two subscribing witnesses.

PATRICK MURPHY.

Witnesses:
 JOS. P. LIVERMORE,
 BERNICE J. NOYES.